United States Patent
Yoon et al.

(10) Patent No.: US 8,580,434 B2
(45) Date of Patent: Nov. 12, 2013

(54) CATHODE ACTIVE MATERIAL, METHOD OF PREPARING THE SAME, CATHODE CONTAINING THE CATHODE ACTIVE MATERIAL, AND LITHIUM BATTERY CONTAINING THE CATHODE ACTIVE MATERIAL

(75) Inventors: Jae-gu Yoon, Suwon-si (KR); Seok-gwang Doo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 813 days.

(21) Appl. No.: 12/144,687

(22) Filed: Jun. 24, 2008

(65) Prior Publication Data

US 2009/0136850 A1 May 28, 2009

(30) Foreign Application Priority Data

Nov. 27, 2007 (KR) .................. 10-2007-0121410

(51) Int. Cl.
*H01M 4/00* (2006.01)
(52) U.S. Cl.
USPC ............... 429/221; 429/231.5; 429/231.95
(58) Field of Classification Search
USPC .................................................. 429/232
See application file for complete search history.

(56) References Cited

U.S. PATENT DOCUMENTS

| | | | | |
|---|---|---|---|---|
| 2004/0185343 A1* | 9/2004 | Wang et al. | ............... | 429/218.1 |
| 2005/0031958 A1* | 2/2005 | Fukuoka et al. | ............ | 429/218.1 |
| 2005/0281727 A1* | 12/2005 | Yoshizawa et al. | ........... | 423/385 |
| 2006/0110648 A1 | 5/2006 | Lee et al. | | |
| 2006/0147797 A1 | 7/2006 | Wu et al. | | |
| 2006/0222953 A1* | 10/2006 | Inoue et al. | ............ | 429/232 |
| 2007/0065725 A1* | 3/2007 | Inoue et al. | ............ | 429/232 |
| 2007/0092780 A1* | 4/2007 | Vyas et al. | .............. | 429/34 |

FOREIGN PATENT DOCUMENTS

| | | |
|---|---|---|
| JP | 08-222219 | 8/1996 |
| JP | 10-041312 | 2/1998 |
| JP | 2003-100153 | 4/2003 |
| JP | 2003-292308 | 10/2003 |
| JP | 2006-156385 | 6/2006 |
| JP | 2006-190642 | 7/2006 |
| JP | 2006-516803 | 7/2006 |
| JP | 2007-103339 | 4/2007 |

OTHER PUBLICATIONS

Patent Abstracts of Japan, and English machine translation of Japanese Publication 8-222219 dated Aug. 30, 1996, (13 pages).
Patent Abstracts of Japan, and English machine translation of Japanese Publication 10-041312 dated Feb. 13, 1998, (12 pages).
Patent Abstracts of Japan, and English machine translation of Japanese Publication 2003-100153 dated Apr. 4, 2003, (34 pages).
Patent Abstracts of Japan, and English machine translation of Japanese Publication 2007-103339 dated Apr. 19, 2007, (33 pages).

* cited by examiner

*Primary Examiner* — Patrick Ryan
*Assistant Examiner* — Lucas J. O'Donnell
(74) *Attorney, Agent, or Firm* — Christie, Parker & Hale, LLP

(57) ABSTRACT

A cathode active material includes a lithium metal phosphate represented by Formula 1; and one or more compounds selected from the group consisting of a metal oxynitride, a metal nitride, and a mixture thereof:

$$LiMPO_4 \quad \text{<Formula 1>}$$

where M is selected from the group consisting of Fe, Ti, V, Cr, Co and Ni.

11 Claims, 4 Drawing Sheets

CATHODE ACTIVE MATERIAL, METHOD OF PREPARING THE SAME, CATHODE CONTAINING THE CATHODE ACTIVE MATERIAL, AND LITHIUM BATTERY CONTAINING THE CATHODE ACTIVE MATERIAL

CROSS-REFERENCE TO RELATED APPLICATION

This application claims the benefit of Korean Application No. 2007-121410, filed Nov. 27, 2007, in the Korean Intellectual Property Office, the disclosure of which is incorporated herein by reference.

BACKGROUND OF THE INVENTION

1. Field of the Invention

Aspects of the present invention relate to a cathode active material, a method of preparing the cathode active material, a cathode containing the cathode active material, and a lithium battery containing the cathode active material. More particularly, aspects of the present invention relate to a cathode active material containing a metal oxynitride or metal nitride, a method of preparing the cathode active material, a cathode containing the cathode active material, and a lithium battery containing the cathode active material.

2. Description of the Related Art

Li—Co based oxides, which are used in secondary batteries, have a high conductivity and high energy density and provide a long operation time. For example, $LiCoO_2$ has a conductivity of about $10^{-4}$ to $10^{-3}$ S/cm. However, $LiCoO_2$ has an electrical capacity of only about 140 mAh/g and is expensive. When a battery is charged, some of the lithium is removed from $LiCoO_2$ to form $Li_{1-x}CoO_2$ (0<x<1), which is inherently unstable in a battery.

Lithium metal phosphate is inherently stable. For example, $LiFePO_4$ has a strong bonding of Fe—P—O, and thus, it is difficult to liberate oxygen even when a battery is short-circuited or over-heated. The theoretical electrical capacity of $LiFePO_4$ is about 170 mAh/g, but its substantial electrical capacity is about 110 mAh/g due to its low conductivity.

To improve conductivity of $LiFePO_4$, $LiFePO_4$ can be doped with a transition metal or an alkali metal, or can be coated with carbon. JP P2003-292308 discloses a technique of coating a carbonaceous material on $LiFeO_4$ particles. The coating results in an increase in conductivity from $10^{-9}$ S/cm to about $10^{-7}$ to $10^{-5}$ S/cm, and the carbon-coated $LiFeO_4$ has a substantial electrical capacity of about 165 mAh/g.

SUMMARY OF THE INVENTION

Aspects of the present invention provide a cathode active material including: a lithium metal phosphate represented by Formula 1; and one or more compound selected from metal oxynitride, metal nitride, and a mixture thereof:

$LiMPO_4$ <Formula 1> where M is selected from the group consisting of Fe, Ti, V, Cr, Co and Ni.

Aspects of the present invention also provide a method of preparing a cathode active material, the method including: reacting a lithium metal phosphate represented by Formula 1 with an organometallic compound to prepare a first intermediate; reacting the first intermediate with a nitrogen compound to prepare a second intermediate; and heat-treating the second intermediate in an inert atmosphere:

$LiMPO_4$ <Formula 1> where M is selected from the transition metal group consisting of Fe, Ti, V, Cr, Co and Ni.

Aspects of the present invention also provide a method of preparing a cathode active material, the method including: reacting a lithium metal phosphate with a nitrogen compound to prepare an intermediate; and heat-treating the intermediate in an inert atmosphere:

$LiMPO_4$ <Formula 1> where M is selected from the transition metal group consisting of Fe, Ti, V, Cr, Co and Ni.

Aspects of the present invention also provide a cathode containing the cathode active material and a lithium battery containing the cathode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A cathode active material according to an embodiment of the present invention includes a lithium metal phosphate represented by Formula 1; and one or more compound selected from the group consisting of metal oxynitride, metal nitride, and a mixture thereof:

$LiMPO_4$ <Formula 1> where M is selected from the transition metal group consisting of Fe, Ti, V, Cr, Co and Ni.

Inclusion of a highly conductive metal oxynitride and/or metal nitride in the cathode active material may result in an increase in the electrical capacity of a battery, a decrease in the amount of a conducting material needed, an increase in density of an electrode, and an improvement in a high-rate discharging property. The metal oxynitride and/or metal nitride has a conductivity that is several to hundreds of times higher than a conventional carbonaceous conducting material.

According to an aspect of the present invention, the lithium metal phosphate can be coated with carbon to obtain a high conductivity. The lithium metal phosphate coated with carbon can be obtained by mixing a lithium metal phosphate precursor with a carbon precursor and then heat-treating the mixture. The carbon precursor can be a hydrocarbon compound, but is not limited thereto. For example, the carbon precursor can be any commercially available material that can be converted into carbon by carbonization. The amount of the coating carbon may be in the range of 0.1 to 10 wt % based on the total weight of the cathode active material. However, the amount of the coating carbon may vary according to its applications.

According to an aspect of the present invention, the metal oxynitride can be represented by Formula 2:

$$MO_xN_y \qquad \text{<Formula 2>}$$

where $0<x<2$, $0<y<1$, and M is selected from Ti, V, Mo, and Ta. As a specific, non-limiting example, M can be selected from Ti, V, and Mo.

According to another aspect of the present invention, the metal nitride can be represented by Formula 3:

$$MN_z \qquad \text{<Formula 3>}$$

where $0<z\leq1$ and M is selected from Ti, V, Mo and Ta. As a specific, non-limiting example, M can be selected from Ti, V, and Mo.

According to another aspect of the present invention, the conductivity of the metal oxynitride or metal nitride may be 10 S/cm or more. As a specific, non-limiting example, the conductivity of the metal oxynitride or metal nitride can be $10^2$ S/cm or more. As a more specific, non-limiting example, the conductivity of the metal oxynitride or metal nitride can be $10^3$ S/cm or more. Due to such high conductivity of the metal oxynitride or metal nitride, the lithium metal phosphate can have an improved conductivity.

According to another aspect of the present invention, the relative amount of the metal oxynitride, metal nitride, or a mixture thereof in the cathode active material may be in a range of 0.1 to 10 moles based on 100 moles of the lithium metal phosphate.

The metal oxynitride, metal nitride, or a mixture thereof having such an amount range is suitable for a cathode active material according to aspects of the present invention. When the amount of the metal oxynitride, metal nitride, or a mixture thereof is less than 0.1 moles based on 100 moles of the lithium metal phosphate, the conductivity improvement effect may not be obtained. On the other hand, when the amount of the metal oxynitride, metal nitride, or a mixture thereof is greater than 10 moles based on 100 moles of the lithium metal phosphate, a discharge capacity per a weight of the cathode active material may be reduced. However, the amount of the metal oxynitride, metal nitride, or a mixture thereof may be beyond the range of 0.1 to 10 moles based on the 100 moles of the lithium metal phosphate provided that an object of the present invention is achieved.

According to another embodiment of the present invention, the cathode active material can include a core and a coating layer formed on a surface of the core, wherein the core can include the lithium metal phosphate and the coating layer can include the metal oxynitride, metal nitride or a mixture thereof. That is, the cathode active material can include a lithium metal phosphate core and a metal oxynitride and/or metal nitride coating layer at the surface of the core. Due to the coating layer, the electrical capacity and/or conductivity of the cathode active material can be improved and the cathode active material can be increased in volume compared to the carbonaceous coating layer.

The coating layer including the metal oxynitride, metal nitride or a mixture thereof can be entirely or partially formed on the surface of the core. In other words, the coating layer can be entirely or partially coated on the surface of the core. Since the coating layer exists at the surface of the core, the coating layer is electrically connected to the core and thus conductivity of the core can be improved and electrical capacity of the cathode active material can be improved.

According to an embodiment of the present invention, a method of preparing a cathode active material includes: reacting a lithium metal phosphate represented by Formula 1 with an organometallic compound to prepare a first intermediate; reacting the first intermediate with a nitrogen compound to prepare a second intermediate; and heat-treating the second intermediate in an inert atmosphere:

$$LiMPO_4 \qquad \text{<Formula 1>}$$

where M is selected from the transition metal group consisting of Fe, Ti, V, Cr, Co and Ni. As a result of this method, a metal oxynitride can be prepared.

In the method according to the current embodiment, the heat-treating process can be performed at 500° C. or more. As a specific, non-limiting example, the heat-treating process can be performed at a temperature of 500 to 800° C. However, the heat-treatment temperature is not limited thereto and can vary according to the composition ratio of the cathode active material. When the heat-treatment temperature is less than 500° C., a transition metal nitride may not be formed or the formed transition metal nitride may be unstable.

The heat-treating process may be performed for 1 to 3 hours. However, the heat treatment time is not limited to such range, and can vary according to a composition ratio of the cathode active material.

The organometallic compound can be titanium isopropoxide; a metal alkoxide, such as vanadium isopropoxide, titanium butoxide, or the like; a metal halide, such as titanium chloride or the like; or ammonium heptamolybdate. The organometallic compound can react with the lithium metal phosphate to form an intermediate that is an organometallic compound having an oxygen atom at its surface. The organometallic compound can be any commercially available organometallic compound that is used to prepare metal oxynitride in the art.

The nitrogen compound can be hydrazine, or an amine compound such as hexamethyl tetramine. The nitrogen compound can react with lithium metal phosphate to prepare an intermediate that is a lithium metal phosphate having a nitrogen atom at its surface. The nitrogen compound can be any nitrogen compound that is used in the art to prepare a metal nitride and/or metal oxynitride.

According to another embodiment of the present invention, a method of preparing a cathode active material includes: reacting the lithium metal phosphate represented by Formula 1 with a nitrogen compound to prepare a third intermediate; and heat-treating the third intermediate in inert atmosphere. As a result of the current embodiment, a metal nitride can be prepared. The heat-treatment temperature and time are the same as in the method of preparing the metal oxynitride according to the previous embodiment. The nitrogen compound can be the same as described in the previous embodiment.

According to an embodiment of the present invention, a cathode includes a cathode active material as described above. As a non-limiting example, the cathode can be manufactured by molding a cathode material composition including the cathode active material and a binder into a predetermined shape. Alternatively, the cathode can be manufactured by coating the cathode material composition onto a current collector such as an aluminum foil. The cathode material composition can further include a conducting material, a solvent, or the like.

Specifically, a cathode material composition can be directly coated onto a current collector such as aluminum foil to obtain a cathode plate. Alternatively, a cathode material composition can be cast onto a separate substrate to form a cathode active material film, and the formed cathode active material film may be then exfoliated from the substrate and laminated onto a current collector such as aluminum to obtain a cathode plate. The cathode can also be manufactured using any other methods.

To develop batteries having a high capacity, materials having low electrical resistance are required to charge or discharge a great amount of current. A reduction in the resistance of an electrode can be achieved using various kinds of conducting materials, such as carbon black or graphite particles.

The binder can be vinylidene fluoride/hexafluoropropylene copolymer, polyvinylidenefluoride, polyacrylonitrile, polymethylmethacrylate, polytetrafluoroethylene, a mixture thereof, or styrene butadiene rubber-based polymer. The solvent can be N-methylpyrrolidone (NMP), acetone, or water. The amounts of the cathode active material, the conducting material, the binder and the solvent may be the same as in conventional lithium batteries.

A lithium battery according to an embodiment of the present invention includes a cathode including the cathode active material according to an embodiment of the present invention. A method of preparing the lithium battery will now be described in detail.

A cathode including the cathode active material is manufactured as described above. An anode material composition is prepared by mixing an anode active material, a conducting material, a binder, and a solvent. The anode material composition can be directly coated on a copper collector to obtain an anode plate. Alternatively, the anode material composition can be cast onto a separate support to form an anode active material film, and the formed anode active material film may then be exfoliated from the substrate and laminated onto a copper collector to obtain an anode plate.

The anode active material can be any anode active material that is commercially available in the art. For example, the anode active material can be lithium metal, lithium alloy, carbonaceous material, and/or graphite. The conducting material, the binder and the solvent may be the same kinds that are used in the cathode. The amounts of the anode active material, the conducting material, the binder and the solvent may be the same as those used in conventional lithium batteries.

Then, a separator is provided between the anode and the cathode. The separator can be any separator that can be used in conventional lithium batteries. For example, the separator can have low resistance to flow of ions of an electrolyte and an excellent electrolyte-retaining ability. For example, the separator can be glass fiber, polyester, Teflon, polyethylene, polypropylene, polytetrafluoroethylene (PTFE), or a combination thereof, each of which can be in a form of a nonwoven or woven fabric. Specifically, a lithium ion battery includes a foldable separator, such as polyethylene or polypropylene, and a lithium ion polymer battery includes a separator that has an excellent organic electrolyte-retaining ability. A method of preparing these separators will now be described in detail.

A separator composition is prepared by mixing a polymer resin, a filler and a solvent. Then, the separator composition can be directly coated onto an electrode and dried to form a separator film. Alternatively, the prepared separator composition can be cast onto a separate support and dried to form a separator film, and the formed separator film may then be exfoliated from the support and laminated onto an electrode.

The polymer resin is not limited and can be any material that is used as a binder for an electrode plate. For example, the binder can be vinylidenefluoride/hexafluoropropylene copolymer, polyvinylidenefluoride, polyacrylonitrile, polymethylmethacrylate or a mixture thereof.

The electrolyte can be a lithium salt dissolved in a solvent. For example, the lithium salt can be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO2)(C_yF_{2y+1}SO_2)$ where x and y are natural numbers, LiCl, LiI, or a mixture thereof; and the solvent can be propylene carbonate, ethylene carbonate, fluoroethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylisopropylcarbonate, ethylpropylcarbonate, dipropylcarbonate, dibutylcarbonate, diethyleneglycol, dimethylether, or a mixture thereof.

Then, the separator is placed between the cathode plate and the anode plate to form a battery assembly. The battery assembly is wound and/or folded such that it can be placed in a spherical battery case or a rectangular battery case, and then the organic electrolyte is injected thereto. As a result, a lithium ion battery is manufactured.

A plurality of such battery assemblies can be stacked in a bi-cell structure, and then immersed in an organic electrolytic solution. The obtained structure is placed in a pouch and sealed. As a result, a lithium ion polymer battery is manufactured.

Aspects of the present invention will be described in further detail with reference to the following examples. These examples are for illustrative purposes only and are not intended to limit the scope of the present invention.

Preparation of Cathode Active Material

Example 1

1 g of carbon-coated $LiFePO_4$ and 0.018 g of titanium isopropoxide (Ti/Fe mole ratio=1/100) were added to 25 g of acetonitrile ($CH_3CN$) solvent in a reactor and mixed together for 30 minutes. Then, hydrazine ($H_2NNH_2$) in such an amount to provide a mole ratio of hydrazine to titanium isopropoxide of 10:1 was further added to the reactor and stirred for 12 hours. The stirred reaction solution was heat-treated in a nitrogen atmosphere at 600° C. for 1 hour to produce a cathode active material including a metal oxynitride.

Example 2

A cathode active material including a metal oxynitride was prepared in the same manner as in Example 1, except that the amount of titanium isopropoxide added to the reactor was 0.09 g (Ti/Fe mole ratio=5/100.)

Example 3

A cathode active material including a metal oxynitride was prepared in the same manner as in Example 1, except that the amount of titanium isopropoxide added to the reactor was 0.18 g (Ti/Fe mole ratio=10/100.)

Comparative Example 1

A commercially available carbon-coated LiFePO$_4$ was used as a cathode active material.

Comparative Example 2

1 g of carbon-coated LiFePO$_4$ and 0.09 g of titanium isopropoxide were added to 25 g of acetonitrile (CH$_3$CN) solvent in a reactor and the mixture was stirred for 30 minutes. Then, 1 g of distilled water was added to the reactor and a hydrolysis reaction was performed. When the hydrolysis reaction was completed, the reaction was vacuum-dried to produce a cathode active material including titanium dioxide.

Manufacturing of Cathode and Lithium Battery

Example 4

The cathode active material prepared according to Example 1, in powder form, a carbonaceous conducting material (Super-P, Timcal, USA) and N-methylpyrrolidone (NMP) were mixed with a 5 wt % polyvinylidenefluoride (PVDF) solution in an agate mortar to prepare slurry including a cathode active material:graphite:polyvinylidenefluoride in a weight ratio of 90:5:5. The slurry was coated onto a 15 μm-thick aluminum foil using a doctor blade to a thickness of about 100 μm. The coated slurry was dried at 80° C. and then dried in a vacuum at 110° C. to produce a cathode plate.

A 2016 coin cell was manufactured using the cathode plate, a lithium metal counter electrode, a polytetrafluoroethylene (PTFE) separator, and 1.3M LiPF$_6$ dissolved in a solution mixture of EC(ethylene carbonate) and DEC(diethylene carbonate) in a volume ratio 3:7 which acts as an electrolyte.

Example 5

A coin cell was manufactured in the same manner as in Example 4, except that the cathode active material prepared according to Example 2 was used instead of the cathode active material prepared according to Example 1.

Example 6

A coin cell was manufactured in the same manner as in Example 4, except that the cathode active material prepared according to Example 3 was used instead of the cathode active material prepared according to Example 1.

Comparative Example 3

A coin cell was manufactured in the same manner as in Example 4, except that the cathode active material prepared according to Comparative Example 1 was used instead of the cathode active material prepared according to Example 1.

Comparative Example 4

A coin cell was manufactured in the same manner as in Example 4, except that the cathode active material prepared according to Comparative Example 2 was used instead of the cathode active material prepared according to Example 1.

Evaluation Example 1

XPS (X-Ray Photoelectron Spectrum) Experiment

An X-ray photoelectron experiment was performed on each of the cathode active materials prepared according to Examples 1-3 and Comparative Example 1 using a photoelectron spectrometer (Q2000 produced by PHI Co.). The X-ray source was mono Al—Kα 1486.6 eV, 10 μm. The results are shown in FIGS. 1-3.

Figure 1:
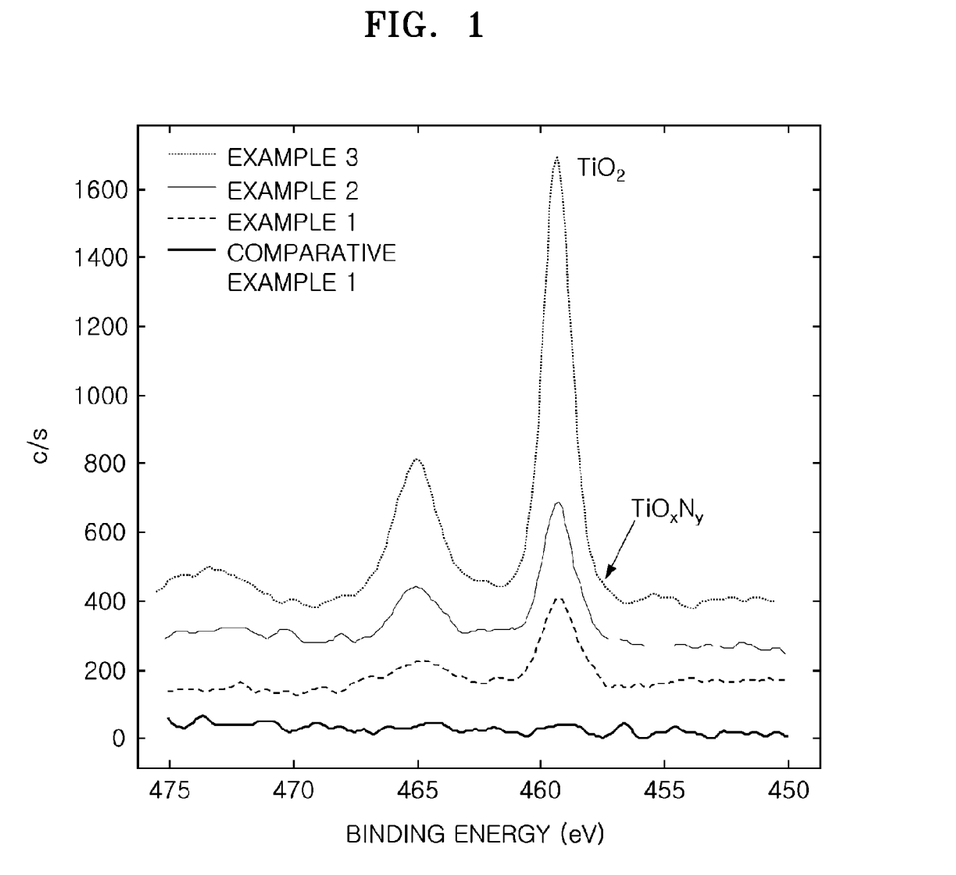
FIG. 1 is a graph illustrating the X-ray spectroscopy spectra of the cathode active material powders prepared according to Examples 1-3 and Comparative Example 1.
Figure 2:
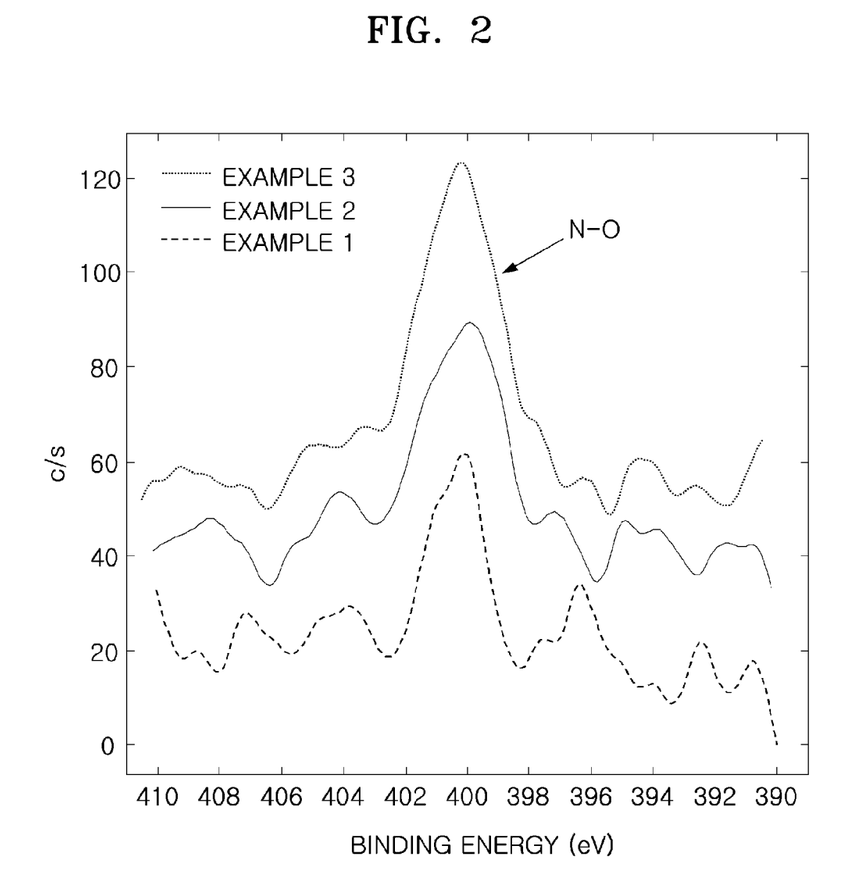
FIG. 2 is a graph illustrating the X-ray spectroscopy spectra of the cathode active material powders prepared according to Examples 1-3.

Referring to FIG. 1, Examples 1-3 show a strong peak of titanium dioxide (TiO$_2$) and a weak peak of titanium oxynitride (TiO$_x$N$_y$), but Comparative Example 1 does not show a peak of titanium dioxide (TiO$_2$). Referring to FIG. 2, Examples 1-3 show a peak of oxynitride (N—O).

Figure 3:
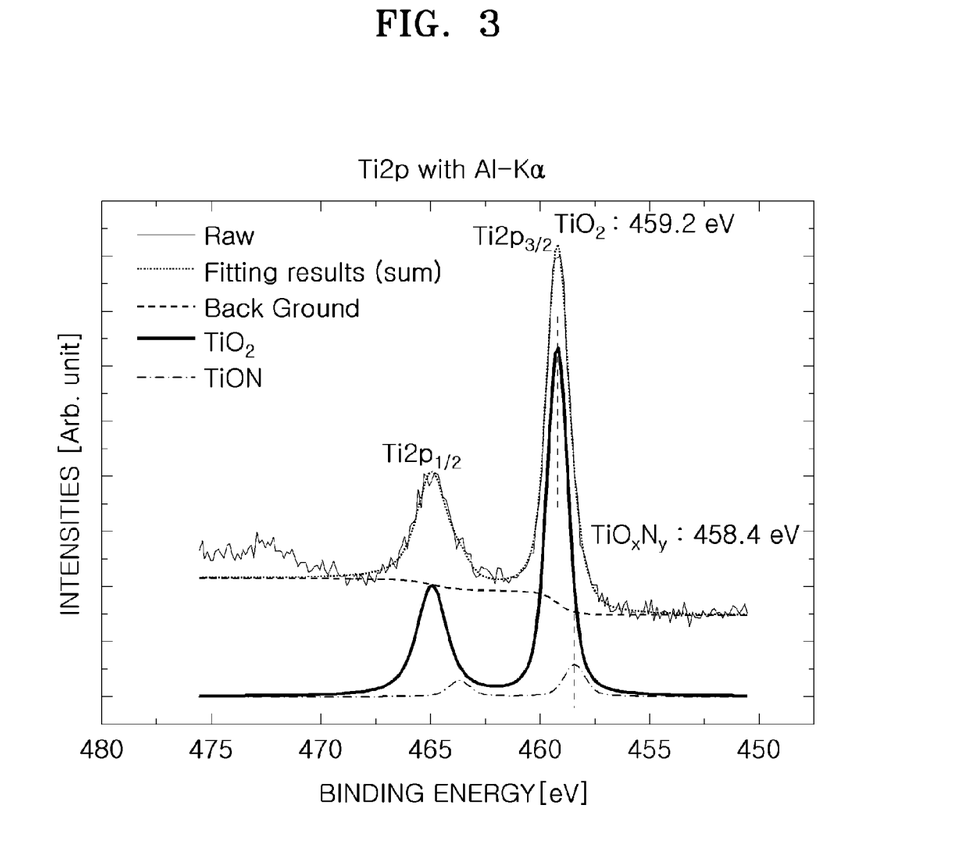
FIG. 3 is a graph of the X-ray spectroscopy spectra of FIG. 1 which has been subjected to background correction.

Results of Example 3 of FIG. 1 were subjected to background correction and corrected results are shown in FIG. 3. The peak of titanium oxynitride (TiO$_x$N$_y$) is more clearly shown in FIG. 3 in which the peak of titanium dioxide (TiO$_2$) appears at 459.2 eV, and the peak of titanium oxynitride (TiO$_x$N$_y$) appears at 458.4 eV.

Evaluation Example 2

Charging and Discharging Tests

The coin cells prepared according to Examples 4-6 and Comparative Examples 3-4 were charged with a current in a current density of 75 mA with respect to 1 g of a cathode active material until a voltage reached 4.6V (vs. Li). Then, the charge coin cells were discharged with a current density of 30 mA/g, 150 mA/g and 750 mA/g until the voltage reached 2.5V (vs. Li).

TABLE 1

|  | Discharge energy at a discharging speed of 30 mA/g [mWh/g] | Discharge energy at a discharging speed of 150 mA/g [mWh/g] | Discharge energy at a discharging speed of 750 mA/g [mWh/g] |
| --- | --- | --- | --- |
| Example 4 | 501 | 428 | 166 |
| Example 5 | 445 | 358 | 193 |
| Example 6 | 447 | 322 | 0 |
| Comparative Example 3 | 401 | 194 | 0 |
| Comparative Example 4 | 312 | 206 | 0 |

Figure 4:
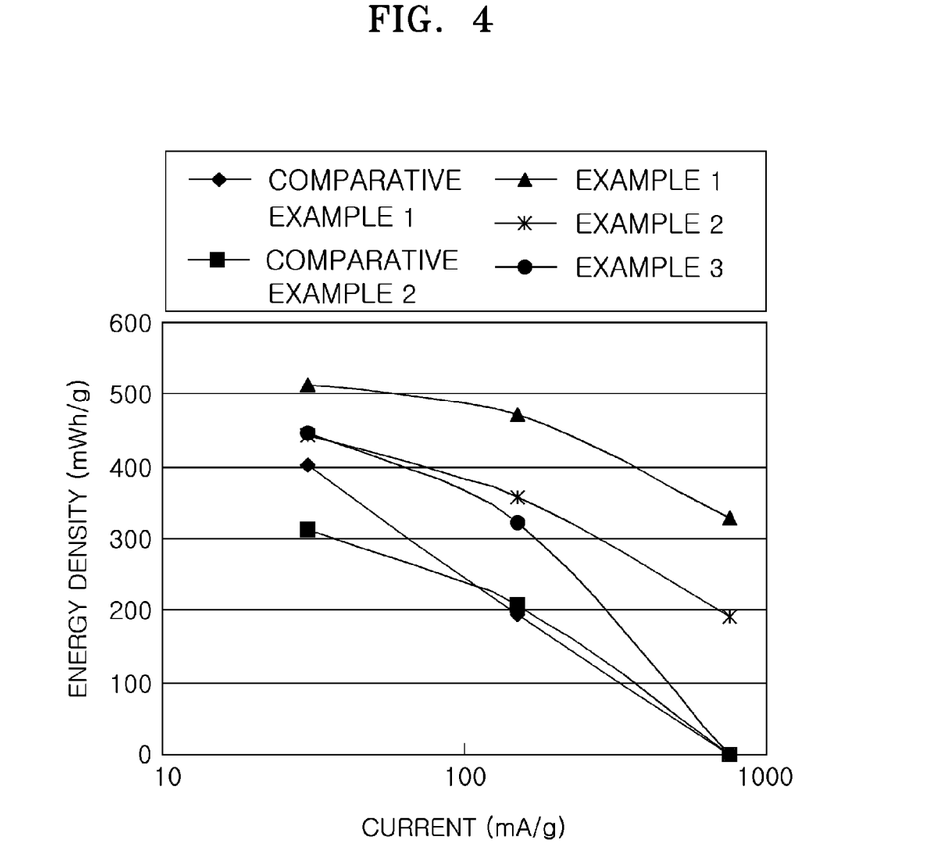
FIG. 4 is a graph showing high-rate discharge properties of the batteries prepared according to Examples 4-6 and Comparative Examples 3 and 4.

Referring to Table 1 and FIG. 4, the coin cells prepared according to Examples 4-6 have a higher energy density than the coin cells prepared according to Comparative Example 3-4. In addition, in high-rate discharge conditions, that is, when the current density is high, the coin cells prepared according to Examples 4-6 have higher energy density than the coin cells prepared according to Comparative Example 3-4.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode active material comprising:
a lithium metal phosphate represented by Formula 1; and
an additive comprising a metal oxynitride and a metal oxide, wherein the metal of the metal oxynitride is selected from the group consisting of Ti, Mo and Ta and the metal of the metal oxide is selected from the group consisting of Ti, Mo and Ta:

$$LiMPO_4 \qquad \text{<Formula 1>}$$

where M is selected from the group consisting of Fe, V, Cr, Co and Ni, wherein the cathode active material comprises a core and a coating layer formed on a surface of the core, wherein the core comprises the lithium metal phosphate, and the coating layer comprises the metal oxynitride and the metal oxide, wherein a mole ratio of the metal of the coating layer to the metal of the lithium metal phosphate is from 1:100 to 5:100.

2. The cathode active material of claim 1, wherein the lithium metal phosphate is coated with carbon.

3. The cathode active material of claim 1, wherein the metal oxynitride is represented by Formula 2:

$$M'O_xN_y \qquad \text{<Formula 2>}$$

where $0<x<2$, $0<y<1$, and M' is selected from the group consisting of Ti, Mo, and Ta.

4. The cathode active material of claim 1, wherein the conductivity of the metal oxynitride is 10 S/cm or more.

5. The cathode active material of claim 1, wherein the conductivity of the metal oxynitride is $10^2$ S/cm or more.

6. The cathode active material of claim 1, wherein the conductivity of the metal oxynitride is $10^3$ S/cm or more.

7. The cathode active material of claim 1, wherein the relative amount of the metal oxynitride in the cathode active material is in a range of 0.1 to 10 moles based on 100 moles of the lithium metal phosphate.

8. The cathode active material of claim 1, wherein the coating layer completely covers the core.

9. The cathode active material of claim 1, wherein the coating layer only partially covers the core.

10. A cathode comprising the cathode active material of claim 1 and a current collector.

11. A lithium battery comprising an anode, a cathode and a separator, wherein the cathode comprises the cathode active material of claim 1.

* * * * *

UNITED STATES PATENT AND TRADEMARK OFFICE
CERTIFICATE OF CORRECTION

PATENT NO. : 8,580,434 B2  
APPLICATION NO. : 12/144687  
DATED : November 12, 2013  
INVENTOR(S) : Jae-gu Yoon et al.

Page 1 of 1

It is certified that error appears in the above-identified patent and that said Letters Patent is hereby corrected as shown below:

In the Claims

Column 9, Claim 1, line 3    Delete "LiMPO4"

Insert -- $LiMPO_4$ --

Signed and Sealed this  
Twenty-fourth Day of February, 2015

Michelle K. Lee  
*Deputy Director of the United States Patent and Trademark Office*